Figure 4:
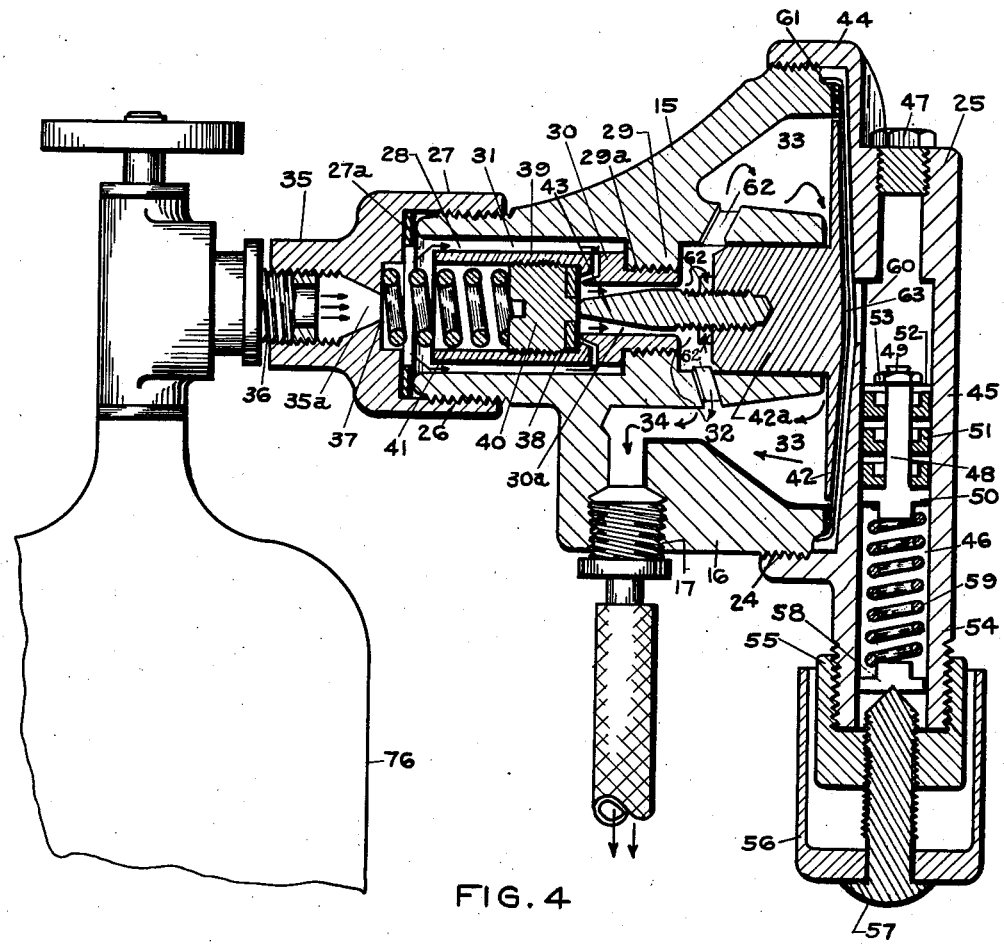

March 26, 1940. W. K. DOW 2,195,242
HIGH AND LOW PRESSURE REGULATOR OR REDUCING VALVE
Filed May 10, 1938 4 Sheets-Sheet 1
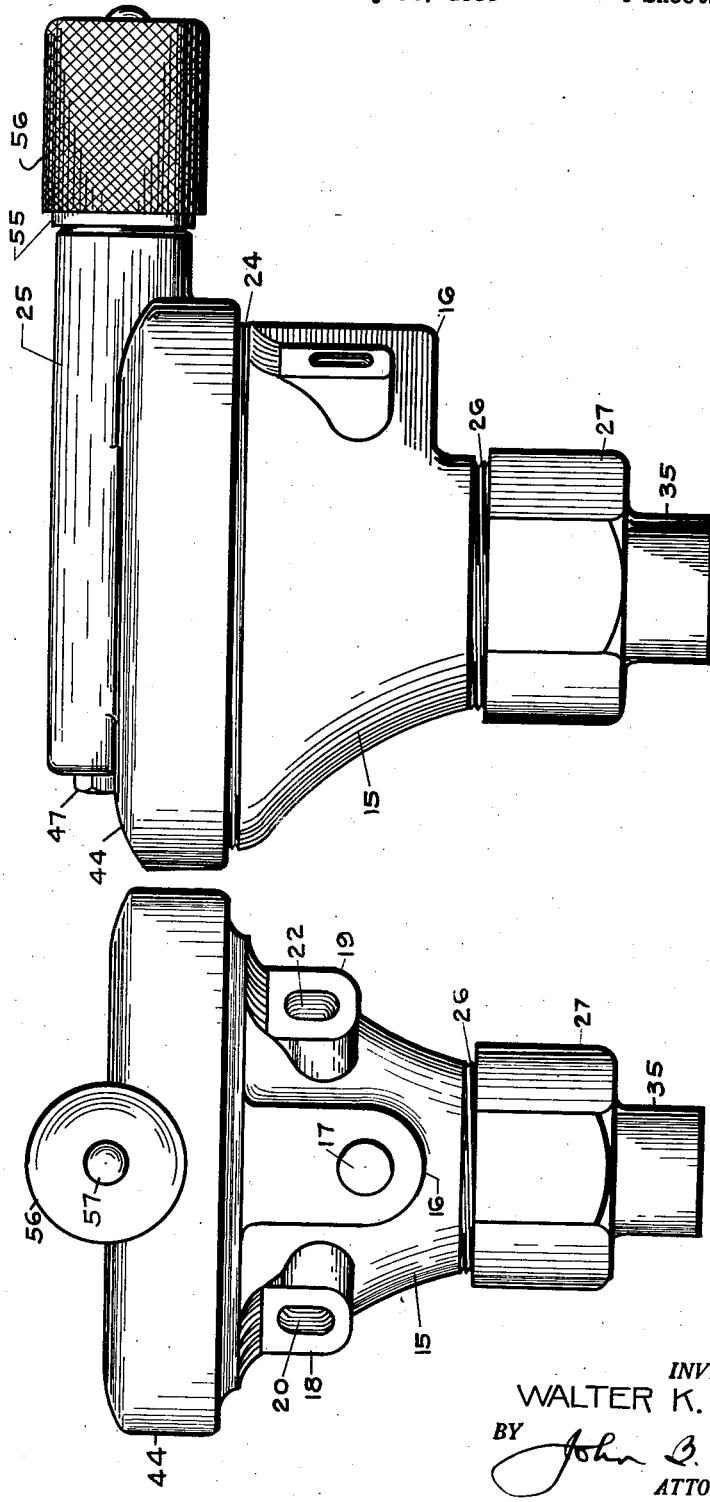
INVENTOR.
WALTER K. DOW
BY John B. Brady
ATTORNEY March 26, 1940. W. K. DOW 2,195,242
HIGH AND LOW PRESSURE REGULATOR OR REDUCING VALVE
Filed May 10, 1938 4 Sheets-Sheet 2

LOW REGULATED PRESSURE GAUGE

HIGH BOTTLE PRESSURE GAUGE

INVENTOR.
WALTER K. DOW
BY John C. Brady
ATTORNEY

March 26, 1940.     W. K. DOW     2,195,242
HIGH AND LOW PRESSURE REGULATOR OR REDUCING VALVE
Filed May 10, 1938     4 Sheets-Sheet 3

INVENTOR.
WALTER K. DOW
BY John B. Brady
ATTORNEY

March 26, 1940. W. K. DOW 2,195,242

HIGH AND LOW PRESSURE REGULATOR OR REDUCING VALVE

Filed May 10, 1938 4 Sheets-Sheet 4

INVENTOR.
WALTER K. DOW
BY John B. Brady
ATTORNEY

Patented Mar. 26, 1940

2,195,242

UNITED STATES PATENT OFFICE 2,195,242

HIGH AND LOW PRESSURE REGULATOR OR REDUCING VALVE

Walter K. Dow, Baltimore, Md.

Application May 10, 1938, Serial No. 207,065

10 Claims. (Cl. 50—15)

My invention relates broadly to improvements in the regulation of air, gases and liquids and more particularly to a method of operation and construction of an air, gas and fluid regulator employing a hydraulic principle of control.

One of the objects of my invention is to provide an improved device for reducing air, gases or liquids from an available high pressure to a steady lower pressure.

Another object of my invention is to provide a simplified construction of pressure regulating valve employing a method of hydraulic control for securing precision adjustment of the regulator.

Another object of my invention is to provide a construction of regulator having means for maintaining a more even low pressure flow of gas when consumption of the regulated gas is intermittent.

Still another object of my invention is to provide a construction of improved regulator having a high margin of safety when the regulator is used in connection with inflammable gases.

Another object of my invention is to provide a regulator or reducing valve that automatically shuts off regulated pressure when the diaphragm which is included in the structure of my invention is ruptured.

A further object of my invention is to provide a construction of improved regulator of reduced cost and enlarged capacity obtainable by increasing the capacity of a much smaller regulator by the application of the hydraulic principle to valve regulation.

Another object of my invention is to provide a construction of spring actuated pressure regulator capable of using a smaller or lighter tension spring on the regulating side of the regulator than on the high pressure side.

Another object of my invention is to provide a pressure regulator construction arranged to increase a small effort by hydraulics to a pressure over a large diaphragm or piston sufficient to open a high pressure valve.

A still further object of my invention is to provide a pressure regulator construction embodying a flexible diaphragm control member in which a hydraulically increased effort against one side of the diaphragm may control a large effective pressure at the opposite side of the diaphragm.

Still another object of my invention is to provide a pressure regulator that does not require gas escape apertures in the body cap of the regulator.

Another object of my invention is to provide a construction of regulator having means for increasing the ratio of capacity to size over conventional type valves and to allow an adjusting screw to be located in a plane other than 90° to the diaphragm.

A further object of my invention is to provide a construction of regulator employing the hydraulic principle in a two stage regulator, each stage having pressure regulating diaphragms but having only one adjusting screw and yet having both stages subject to the proportionate tension on a regulating spring so that the pressure in each stage may be reduced in a common ratio to the size of the respective diaphragms.

Other and further objects and advantages of my invention will be apparent during the course of the following specification.

Figure 3:
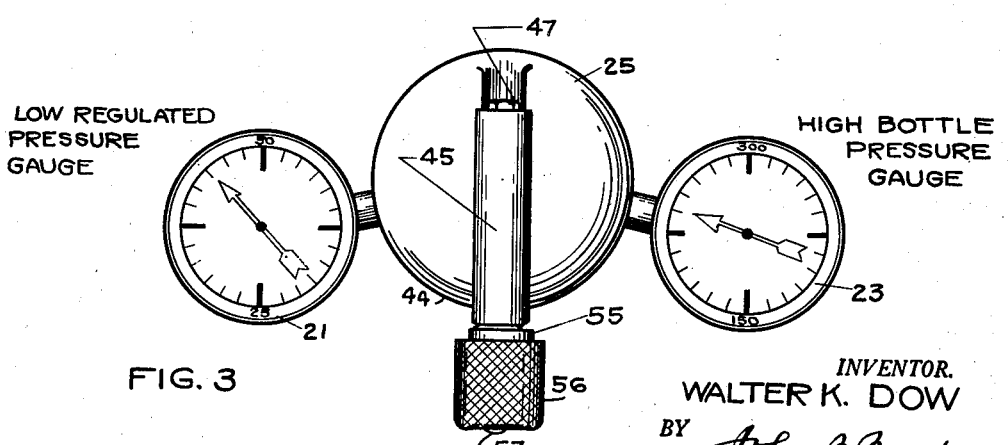
Figure 6:
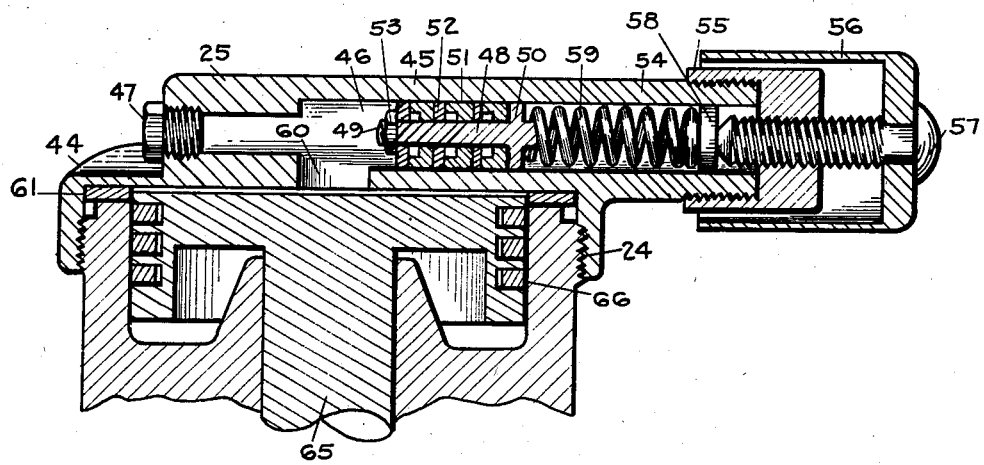
Figure 5:
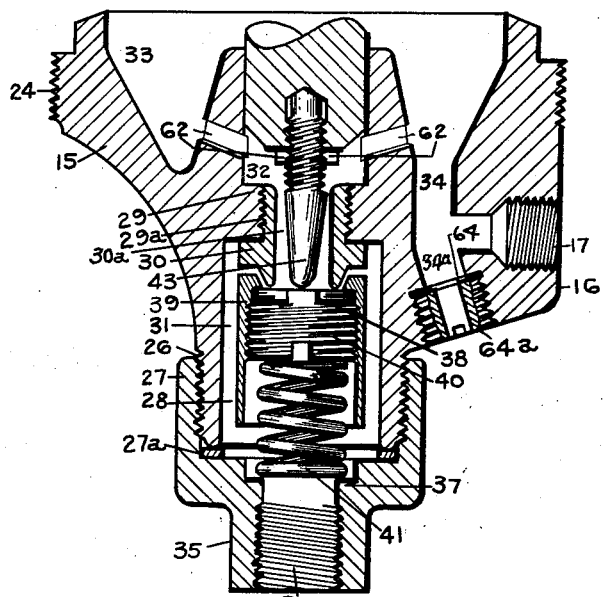
Figure 7:
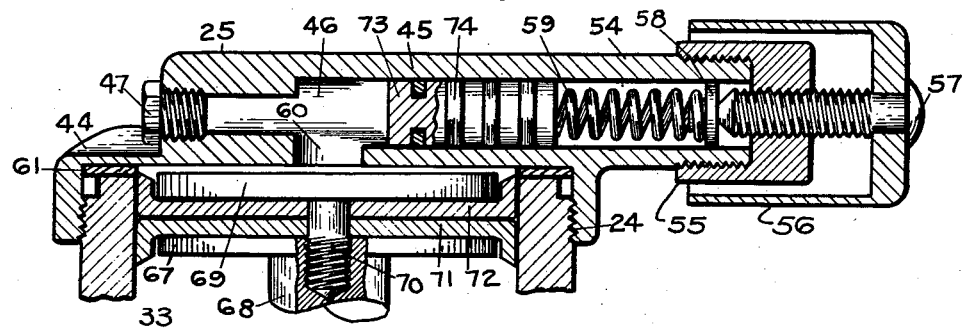
Figure 8:
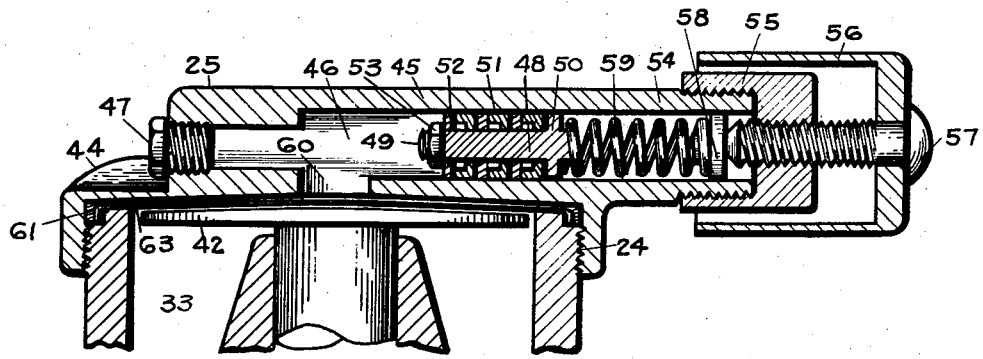
Figure 9:
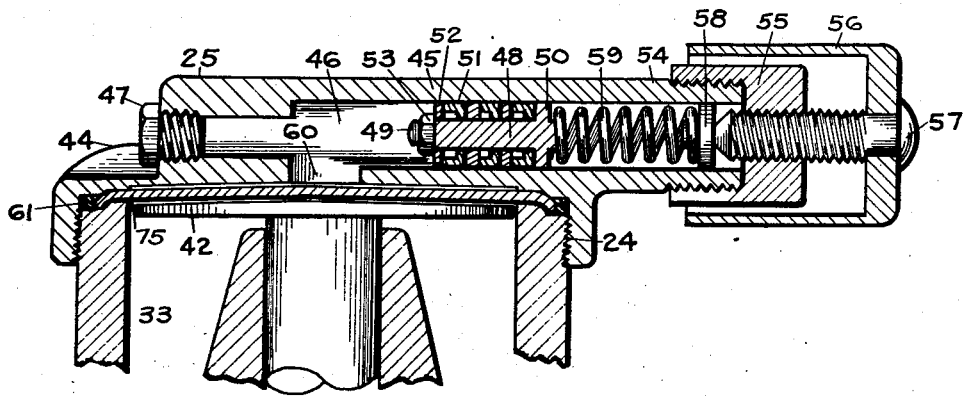

In the accompanying drawings, forming a part of this specification, and in which like numerals are employed to designate like parts throughout the several views:

Figure 1 is a front elevation of a regulator embodying my invention; Fig. 2 is a side elevation of the regulator of my invention; Fig. 3 is a plan view of the regulator showing high and low pressure gauges connected thereto; Fig. 4 is a central vertical longitudinal section through the regulator showing its relation to the high pressure source and to the hose which carries the gas under reduced pressure from the regulator; Fig. 5 is a central vertical section through the regulator valve that may be used in the various embodiments of my invention; Fig. 6 is a fragmentary central vertical longitudinal section through a form of my invention employing a solid piston control device; Fig. 7 is a fragmentary central vertical longitudinal section through another modified form of my invention comprising a control piston of the solid ring type having cup leathers thereon; Fig. 8 is a fragmentary central vertical longitudinal section through the form of regulator valve illustrated in Fig. 4 but showing certain of the parts in side elevation; and, Fig. 9 is a cross sectional view through a further modified form of my invention employing a rubber control diaphragm for greater flexibility and for conditions encountered in the use of different gases.

While I have shown preferred embodiments of my invention in the drawings it will be understood that various modifications are contemplated within the scope of my invention and I do not intend that my invention shall be limited to the particular forms shown.

Referring to Figs. 1, 2 and 3 reference character 15 designates the body portion of the regulator valve which is substantially in the shape of a truncated cone, and having a longitudinally extending projection 16, into which screw threaded opening 17 extends. Angularly disposed at the right and left of the projection 16 and forming an integral part of the body portions 15 are projections 18 and 19. The projection 18 contains a duct 20 which communicates at its inner end with a low pressure chamber enclosed by said body portion, and having its outer end screw threaded so that a low pressure gauge 21 may be connected thereto. The projection 19 contains a duct 22 which communicates at its inner end with a high pressure chamber enclosed by said body portion and having its outer portion screw threaded so that a high pressure gauge 23 may be connected thereto. The upper end of the body portion 15 is screw threaded at 24 to permit a hydraulic casing 25 to be removably connected therewith. The lower end of the body portion is screw threaded at 26 to receive a high pressure coupling member 27.

Referring to Fig. 4 the reference character 28 designates a circular bore running axially through the body portion 15 and having an inwardly extending radial flange 29 substantially centrally thereof, the flange being screw threaded at 29a to support the valve seat 30. The radial flange 29 divides the bore 28 into two portions, one portion forming a high pressure chamber 31 and the other portion forming an inner low pressure chamber 32. Reference character 33 designates an annular recess surrounding the low pressure chamber 32 of the bore 28, said recess forming an outer low pressure chamber and communicating with the inner low pressure chamber 32 through the ports 52. The duct 34 disposed within the longitudinal projection 16, serves to connect the low pressure chamber 33 and the port 17 thereby forming a means of egress for the gas issuing from the valve under reduced pressure.

The high pressure coupling member 27 receives the end of the body portion 15 at one end, the union being made tight by means of packing 27a and has its other end terminating in an internally screw threaded sleeve 35, which connects with the screw threaded nozzle 36 of the carboy or high pressure tank 76. The enlarged end of coupling member 27 communicates directly with the high pressure chamber 31 of the body portion 15. The bore of coupling member 27 contains an annular shoulder 37 whose diameter is slightly larger than that of the passage 35a in coupling member 27.

Reference character 38 designates a valve closure member which coacts with valve seat 30. Valve closure member 38 is retained in the carrier 39 by means of screw threaded plug 40. The compressible coil spring 41 is confined between the screw threaded plug 40 and the annular recess 37 in the high pressure coupling member 27, said spring serving to maintain the valve closure member 38 in engagement with the valve seat 30 under ordinary conditions.

Reference character 42 designates a valve actuator having a spherically curved head whose diameter is slightly smaller than the diameter of the annular recess 33 contained by the body portion 15, and an axially projecting boss or core 42a connected therewith. The valve actuator is mounted to reciprocate within the low pressure chamber 32 of the body portion 15. The valve actuator 42 has a screw threaded recess in the end of the boss or core 42a for receiving a pin 43. The pin 43 extends through the axial bore 30a and engages but is not connected with the screw threaded adjustable plug 40.

The hydraulic casing 25 comprises a circular cap 44 having a cylinder 45 integrally cast thereon and extending in a plane substantially parallel to the head of the valve actuator 42, said cylinder having one end 54 projecting beyond the periphery of said circular cap. The cylinder 45 contains a radially extending bore 46, said bore being screw threaded at one end to receive the filler plug 47.

Piston 48 is mounted in adjustable position within the cylinder 45, said piston being composed of a central shaft 49 having an annular flange 50 adjacent its one end. Arranged in front of the flange 50 are cup leathers 51 supported in position and spaced apart by means of metal washers 52, the whole being firmly held in place by means of the nut 53 engaging the other end of the shaft 49.

The projecting end 54 of the cylinder 45 is screw threaded to receive a screw threaded sleeve 55. Reference character 56 designates a hollow cylindrical shell adapted to fit over the screw threaded sleeve 55 without engaging therewith. The shell 56 carries a screw 57 in its end, said screw being rigidly secured to said shell, and projecting inwardly through a screw threaded aperture provided in the end of sleeve 55. The forward end of the screw 57 engages but is not attached to a spring seat 58, said spring seat being arranged within the bore 46 of the cylinder 45. A compressible spring 59 is disposed between the rear portion of the piston 48 and the spring seat 58, said spring serving to actuate the piston 48.

The circular cap 44 has a restricted opening 60 contained in its top which communicates with the bore 46 of the cylinder 45. The inner periphery of the cap is screw threaded so as to receive the upper end of the body portion 15. Arranged between the upper end of the reduction valve and cap 44 is a metal diaphragm 63, said diaphragm being surrounded at its edge with packing 61 which serves to make the union impervious to either gases or liquids. The diaphragm 63 serves to cover the opening 60 in the hydraulic cylinder and is supported substantially coextensively on its under side by the head of the valve actuator 42. The diaphragm is so flexible or resilient at its center that it may be displaced while its periphery remains clamped in position.

The operation of this form of pressure regulator is as follows:

The bore 46 of the hydraulic cylinder 45 is filled with a hydraulic medium (glycerine, oil or the like) by removing filler plug 47. It can readily be seen that the fluid is retained in the cylinder 45 by the diaphragm 63 and that when the hand adjusting screw 56 is turned, the inwardly projecting screw 57 pushes against the valve seat 58 causing a force to be applied on to piston 48 through the spring 59 and that a relatively great pressure can be exerted against the head of the valve actuator 42 by reason of the hydraulic ratio of the piston diameter to diaphragm diameter.

Gas or liquid issuing from the tank 76 at a relatively high pressure flows into the high pressure chamber 31 of the reducing valve 15, and when the hydraulically applied pressure is sufficiently great to compress the spring 41, valve closure member 38 will be pushed away from valve seat 30 thereby permitting the gas to flow into the inner low pressure chamber 32, through the ports 62 and into the outer low pressure chamber 33. The gas will continue to flow until the pressure on the under side of the head of the valve actuator 42 is sufficient to over-balance the hydraulically applied pressure. When this occurs the valve actuator 42 will be pushed back slightly allowing the valve closure member 38 to press against the valve seat 30 thereby closing the valve. Gas within the outer low pressure chamber is dissipated through the duct 34 and eventually to the position for consumption. When a sufficient amount of the gas in the outer low pressure chamber has passed through the duct 34 the hydraulically applied pressure will again over-balance the combined pressure of the gas and the spring 41 so that the valve actuator 42 will again be depressed thereby opening the valve sufficiently to allow more of the gas to pass into the inner low pressure chamber 32. The valve actuator remains in this position until the gas in the outer low pressure chamber again builds up sufficient pressure on the under side of said valve actuator to over-balance the hydraulic pressure, at which time the valve will again be closed cutting off the passage of gas.

When the hand adjusting screw 56 is properly adjusted the alternately higher pressures on opposite sides of the valve actuator 42 will cause the valve to flutter open and shut thereby controlling the reduced pressure of the gas within a very narrow and precise margin. Any pressure desired can be secured by adjusting the hand adjusting screw 56 until the required amount of pressure desired in the low pressure chamber is secured which will be indicated on the low pressure gauge 21. The restricted opening 60 for the hydraulic fluid prevents surging of the fluid into and out of the cylinder 45, thus preventing oscillation of spring 59 and providing a more uniform control.

It will also be seen that where the flow of regulated gas is irregular the gas supply will be cut off by virtue of the building up of a back pressure in the outer low pressure chamber sufficient to close the valve.

In the event of a rupture of the diaphragm the liquid contained by the hydraulic cylinder will be dissipated into the outlet duct 34. Should this occur there would be no pressure on the hydraulic side, thereby allowing the spring 41 to close the valve, cutting off the gas supply.

The cylinder may be placed in a plane parallel to the diaphragm so that said cylinder may be readily refilled. By backing out the adjusting screw 56 and removing the filler plug 47 the piston 48 may be pushed back. The cylinder may then be filled to filler plug level and the filler plug reinserted.

In Fig. 5, I have shown the parts and arrangement of the reducing valve to be used in all forms of my invention. Duct 34a may be connected to the duct 34 having its outer end screw threaded to receive the pressure relieving diaphragm or blow-out disc 64 secured in position by tubular plug 64a. I thus protect the valve and system against excessive pressures which if delivered to the hose or pipe line might cause leakage or breakage of the hose. The protective system becomes effective in case of failure of the valve to close which might be caused by a particle of dirt or foreign matter accumulating beneath the valve closure member and allowing the gas to accumulate and build up to excessive pressure in the low pressure side of the system.

In Fig. 6, I have shown a modified form of valve actuator. In this form of my invention I use a solid piston 65 for the valve actuator sealed by piston rings 66 and using the inside diameter of the outer low pressure chamber 33 as a cylinder. The diaphragm is omitted. All other parts of the reducing valve and the hydraulic cylinder remain identical with those de- In Fig. 7, I have shown the valve actuator at 68 having a pair of flat circular heads 67 and 69, somewhat smaller in diameter than the inside diameter of the outer low pressure chamber 33 in which it is mounted to reciprocate, said valve actuator 68 having a screw threaded opening in its free end to receive the pin 43 heretofore described. The numeral 69 designates a flat circular plate having the same diameter as plate 67, and having a screw threaded shank 70 extending axially and located centrally thereof. The shank engages a screw threaded opening provided in the first mentioned head, and maintains the two heads in coaxial spaced relation with respect to each other. Interposed between the two heads 67 and 69 and surrounding the shank 70 are two cup leathers 71 and 72, these cup leathers being of the same outside diameter as the inside diameter of the outer low pressure chamber 33. The second mentioned head 69 may be clamped closely to the first mentioned head 67 by virtue of the screw threaded shank 70 thereby causing the cup leathers 71 and 72 to be gripped tightly between them.

In place of the cup leathers or piston 48 in the hydraulic cylinder, I may use a solid piston 73 sealed by piston rings 74 and using the walls of the bore 46 as a cylinder. The diaphragm is omitted. All other parts of the reducing valve and the hydraulic cylinder are similar to those described in connection with Fig. 4.

In Fig. 8, I show a fragmentary view of the hydraulic cylinder metal diaphragm and valve actuator described in Fig. 4 and used in connection with the reduction valve described in Fig. 5.

In Fig. 9, I show the metal diaphragm described in Fig. 4 replaced by a rubber diaphragm 75 which I find has greater flexibility and which is more efficient for certain gases. The rubber diaphragm 75 is arranged in the same position and may be held by the same means as is the metal diaphragm described in Fig. 4. All other parts of the reducing valve and the hydraulic cylinder are similar to those described in connection with Fig. 4.

The operation of the modified forms of my invention is substantially the same as that stated in connection with the first form of the invention.

The different forms of my invention may be employed interchangeably and each has its advantages for control of different gases or liquids. There are occasions in which the piston of Fig. 6 is preferred to the metal diaphragm of Fig. 8, or the cup leather arrangement of Fig. 7, or the rubber diaphragm of Fig. 9.

It will be understood that the arrangement of the valve construction of my invention is such that the spring means in the hydraulic control member may have less tension than the valve closing spring or the sum of the tension of the valve closing spring and the pressure force on the valve seat. That is to say, differences in spring tension may be balanced by differences in size of the valve orifice, thereby taking advantage of the pressure force on the valve seat which may be added to the force resulting from the tension of the valve closing spring. I recognize that the differences in tension of the operating spring in the hydraulic actuator and the valve closing spring are relative and directly related to pressure forces which may be determined by the size of the valve orifice. Accordingly, I intend no limitations upon my invention with respect to particular proportions of the operating spring and valve closing spring except that the operating force shall be of less magnitude than the combined effort of the tension of the valve closing spring plus the pressure effort on the valve seat. I fully appreciate that in modified forms of my invention, the valve closing spring under some circumstances might be omitted and in lieu thereof, the valve orifice so proportioned that the pressure force on the valve seat would be adequate.

As heretofore explained my invention permits the operation of a valve of relatively large capacity by a comparatively small adjusting screw due to the increased force exerted by hydraulic pressure because of the ratio of piston diameter to diaphragm diameter. The valve closing spring can be a stronger spring than the operating spring in the hydraulic control cylinder, thus insuring valve closing in emergencies where the diaphragm may break or leakage develop in the operating mechanism. In the diaphragm type of the construction of my invention the fluid is retained in the cylinder by the diaphragm and in case of breakage said fluid would immediately dissipate into outlet passage and allow the tension of the operating spring to release which in turn would allow the high pressure valve to close.

I desire that it be understood that the forms of my invention shown and described herein are to be taken as preferred examples of my invention, and that various changes in the shape, size and arrangement of parts may be resorted to, without departing from the spirit of my invention or the scope of the appended claims.

What I claim as new and desire to secure by Letters Patent of the United States is as follows:

1. In combination, a pressure reducing valve and a hydraulic cylinder, said reducing valve comprising a housing having a passageway therethrough, said passageway forming a receiving high pressure chamber and an inner coaxial low pressure chamber, a valve in said high pressure chamber for controlling communication between the two chambers, a valve seat arranged to coact with said valve, yieldable means in said high pressure chamber for maintaining the valve normally seated in conjunction with the force of the high pressure on said valve, an outer low pressure chamber disposed annularly around and in communication with said inner low pressure chamber, said outer chamber having a cylindrical portion extending diametrically substantially beyond said inner chamber and having a discharge duct leading therefrom, a valve actuating piston arranged to reciprocate within the cylindrical portion of said outer low pressure chamber, said piston having a concentric shank extending within said inner low pressure chamber, a pin carried by said shank having its end bearing on said valve, a hydraulic cylinder mounted at the end of the reducing valve adjacent the piston and having a hydraulic piston operative therein with an effective area substantially less than that of said valve actuating piston, a hydraulic fluid in said hydraulic cylinder intermediate said pistons, and spring means operative with respect to said hydraulic piston for exerting pressure through said fluid against said valve actuating piston for actuating said valve to maintain substantially uniform pressure in said low pressure chambers.

2. In a reducing valve, control means for regulating the discharge pressure comprising a control valve in the high pressure inlet normally acted upon by the high pressure and maintained thereby in closed position, and differential low pressure means for determining the operation of said valve; said means including a member connected with said valve, and hydraulic pressure means for actuating said member operative in opposition to the discharge pressure on said member and to the force of the high pressure on said valve, said hydraulic pressure means including a hydraulic piston operative to determine the effective pressure applied to said member through said hydraulic pressure means inversely as the ratio of the effective area of said piston to the effective area of said member for controlling the operation of said valve and the discharge pressure.

3. A pressure regulator comprising a housing having high pressure inlet and low pressure outlet chambers, a valve in said inlet chamber normally acted upon by the high pressure therein, a valve seat coacting with said valve, a spring for normally maintaining said valve in engagement with said valve seat in conjunction with the force of the high pressure on said valve, a hydraulic cylinder connected with said housing and containing a hydraulic fluid, a valve actuator operatively connected with said valve and operably related to said hydraulic cylinder to receive hydraulic pressure through said fluid, a hydraulic pressure control member in said hydraulic cylinder for exerting pressure on said fluid and operatively controlling the displacement of said valve actuator, spring means connected with said hydraulic pressure control member, and means for controlling the effective tension of said spring means and the pressure exerted by said control member.

4. A pressure regulator comprising a housing having high pressure inlet and low pressure outlet chambers, a valve in said inlet chamber normally acted upon by the high pressure therein, a valve seat coacting with said valve, a spring for normally maintaining said valve in engagement with said valve seat in conjunction with the force of the high pressure on said valve, a hydraulic cylinder connected with said housing and containing a hydraulic fluid, a valve actuator operatively connected with said valve and having a relatively large pressure area operably related to said hydraulic cylinder to receive hydraulic pressure through said fluid, and means in said hydraulic cylinder for applying force through said fluid and operatively controlling the displacement of said valve actuator comprising spring means, a manually adjustable screw device for controlling the effective tension of said spring means, and a displaceable hydraulic piston of relatively small pressure area operated by said manually adjustable screw device through said spring means for exerting pressure on said fluid, the hydraulic pressure exerted against said valve actuator being determined by the pressure exerted by said hydraulic piston inversely in the ratio of the pressure area of said piston to the pressure area of said valve actuator.

5. A pressure regulator comprising a housing having high pressure inlet and low pressure outlet chambers, a valve in said inlet chamber normally acted upon by the high pressure therein, a valve seat coacting with said valve, a spring for normally maintaining said valve in engagement with said valve seat in conjunction with the force of the high pressure on said valve, a hydraulic cylinder connected with said housing and containing a hydraulic fluid, a valve actuator of relatively large pressure area operatively connected with said valve and operably related to said hydraulic cylinder to receive hydraulic pressure through said fluid, a hydraulic pressure control member of relatively small pressure area in said hydraulic cylinder for exerting pressure on said fluid and operatively controlling the displacement of said valve actuator, spring means connected with said hydraulic pressure control member, and a manually adjustable screw device for controlling the effective tension of said spring means and the pressure exerted by said control member, said spring means having smaller tension than the sum of the tension of the spring which coacts with said valve and the pressure force on the valve, the tension of said spring means being multiplied by hydraulic pressure in the ratio of the effective pressure area of said control member to the effective pressure area of said valve actuator.

6. A pressure regulator comprising a housing having high pressure inlet and low pressure outlet chambers, a valve in said inlet chamber normally acted upon by the high pressure therein, a valve seat coacting with said valve, a spring for normally maintaining said valve in engagement with said valve seat in conjunction with the force of the high pressure on said valve, a hydraulic cylinder connected with said housing and containing a hydraulic fluid, a hydraulic pressure control member in said hydraulic cylinder for exerting pressure on said fluid, manual means for adjusting said hydraulic pressure control member from the exterior of said cylinder, a valve actuator operatively connected with said valve and operably related to said hydraulic cylinder to receive hydraulic pressure through said fluid, said cylinder including a restricted passage for said fluid between said hydraulic pressure control member and said valve actuator for effectively controlling the application of hydraulic pressure with respect to the movement of said valve.

7. In combination with a pressure reducing valve and a diaphragm controlled valve actuator, control means comprising a hydraulic casing having screw threaded means engaged with said reducing valve and a restricted opening for fluid communication with said diaphragm controlled valve actuator, a hydraulic fluid in said casing and in operative relation through said opening with said diaphragm controlled valve actuator, said casing having a radially extending bore, a piston displaceably mounted within said bore for exerting pressure on said fluid, an adjustable spring seat spaced from the piston, a spring interposed between said piston and said adjustable spring seat, and means bearing on said spring seat and operable from without the casing to adjust the tension of said spring and the pressure exerted by said piston, said hydraulic fluid constituting a medium for transmitting pressure in accordance with hydrostatic principles from said piston to the diaphragm controlled valve actuator through the restricted opening in said casing, said opening providing an effective stabilization of the operation of said control means.

8. In combination with a pressure reducing valve and a diaphragm controlled valve actuator, control means comprising a circular cap fitted to said valve in operable relation to said valve actuator, a hydraulic cylinder formed integrally with said cap and having a radially extending bore and restricted outlet means through said cap communicating with said diaphragm controlled valve actuator, a hydraulic fluid in said cylinder and in operative relation through said restricted outlet means with said diaphragm controlled valve actuator, said cylinder extending in a plane substantially parallel to the plane of the cap and having one end projecting beyond the periphery of said cap, a piston displaceably mounted within the bore of said cylinder for exerting pressure on said fluid, an adjustable spring seat spaced from said cylinder, a spring interposed between said adjustable spring seat and said piston, a member engaged with the projecting end of said cylinder and being provided with a screw threaded opening in its end, an adjusting cap surrounding but not engaging the above mentioned member, an inwardly projecting screw carried by said adjusting cap, said screw extending through the screw threaded opening provided in the end of the above mentioned member and having its inner end bearing against said adjustable spring seat, thereby providing an adjustable means for varying the tension on said spring and the pressure exerted by said piston.

9. In a reducing valve, control means for regulating the discharge pressure comprising a control valve in the high pressure inlet normally acted upon by the high pressure and maintained thereby in closed position, spring means in said high pressure inlet operative to exert a force on said valve for urging the valve to closed position, and differential low pressure means for determining the operation of said valve, the last said means including a member connected with said valve, and hydraulic pressure means for actuating said member operative in opposition to the discharge pressure on said member and to the forces of the high pressure and of said spring means on said valve, said hydraulic pressure means including a hydraulic piston operative to determine the effective pressure applied to said member through said hydraulic pressure means inversely as the ratio of the effective area of said piston to the effective area of said member for controlling the operation of said valve and the discharge pressure.

10. In a reducing valve, control means for regulating the discharge pressure comprising a valve in the high pressure inlet, actuating means for said valve in the low pressure outlet including a T-shaped valve actuator having a circular head portion disposed with the middle leg thereof in operative relation to said valve and the circular head portion thereof substantially normal to the direction of movement of said valve, and hydraulic pressure means operative with respect to said T-shaped valve actuator and including a pressure diaphragm arranged in surface abutment with the circular head portion of said valve actuator for substantially the entire pressure area of the diaphragm, said hydraulic pressure means including a closed chamber enclosing a fluid in operative relation to said diaphragm and having a pressure control member of relatively small pressure area operative to exert a pressure on said fluid, the pressure exerted on said pressure diaphragm and said valve actuator through the fluid for effecting operation of said valve being inversely proportional to the ratio of the effective pressure areas of said control member and said diaphragm.

WALTER K. DOW.